Figures 1, 2:
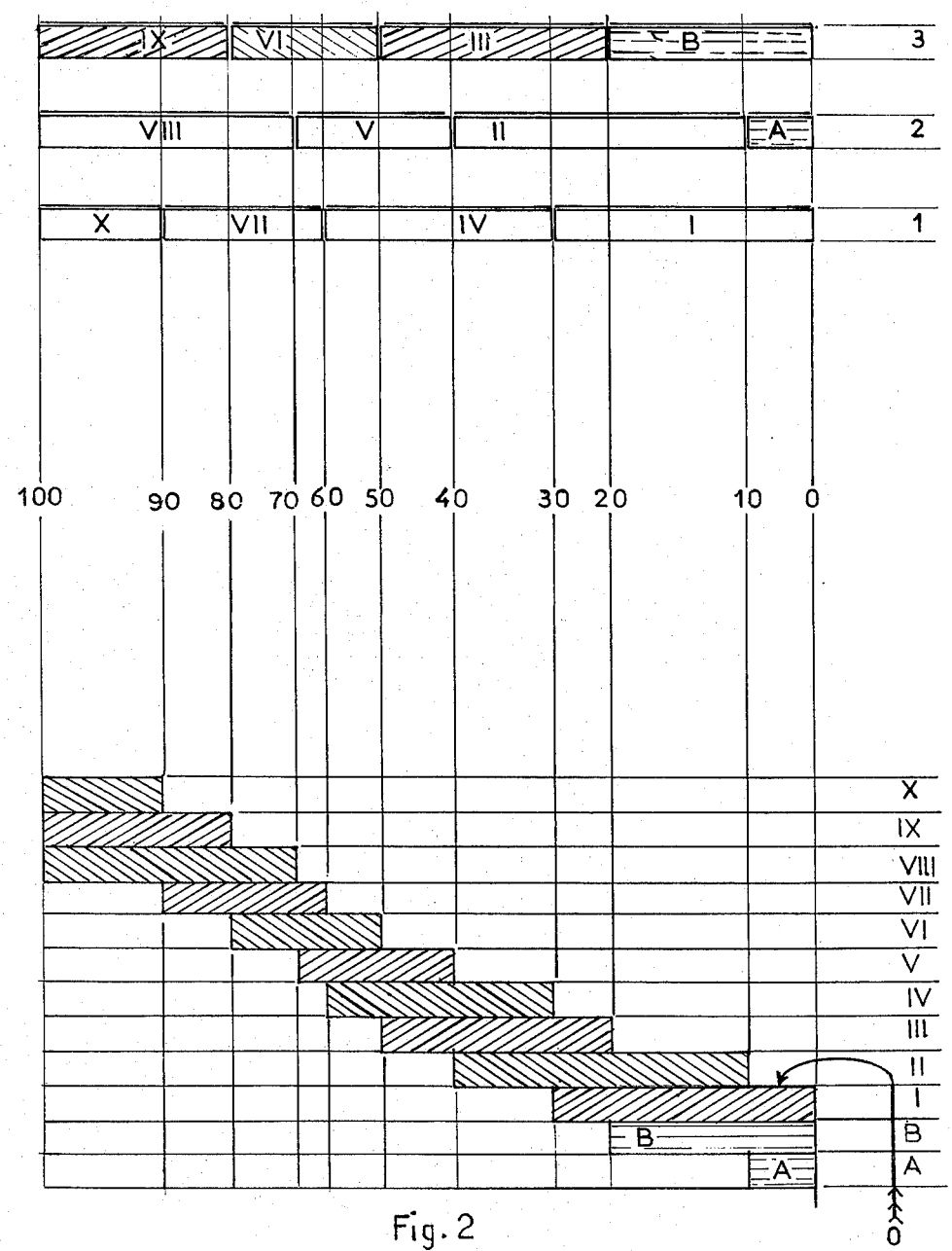

United States Patent [19]

Latapie et al.

[11] 4,298,414

[45] Nov. 3, 1981

[54] METHOD OF FORMING THREE DIMENSIONAL RELIEF MAPS

[76] Inventors: Jean M. Latapie, 114 Avenue Jean de Noailles, 06400 Cannes; Georges Pizzolitto, 96 Avenue des Arenes a, Nice Alpes Maritimes, both of France

[21] Appl. No.: 82,167

[22] Filed: Oct. 5, 1979

Related U.S. Application Data

[63] Continuation of Ser. No. 839,934, Oct. 6, 1977, abandoned.

[30] Foreign Application Priority Data

Oct. 14, 1976 [FR] France .................................. 76 31458

[51] Int. Cl.³ .................... B29C 27/14; B44C 1/10; G09B 29/12
[52] U.S. Cl. ................................. 156/59; 156/58; 156/63; 156/256; 428/39; 428/189; 428/191; 428/542; 434/152
[58] Field of Search ................ 35/40, 41, 42; 156/59, 156/63, 58, 250, 256; 428/39, 174, 189, 191, 542; 434/153, 150, 152

[56] References Cited

U.S. PATENT DOCUMENTS

| | | | |
|---|---|---|---|
| 2,127,546 | 8/1938 | Whittier | 35/42 X |
| 2,556,798 | 6/1951 | Concordet | 35/41 |
| 4,132,575 | 1/1979 | Suzuki et al. | 156/58 |

FOREIGN PATENT DOCUMENTS 114083  3/1918  United Kingdom ................... 35/41

*Primary Examiner*—Robert A. Dawson

[57] ABSTRACT

A sequence of identical planar maps having intervals with contour lines drawn thereon are cut so that from each map a section defined by a pair of spaced contour lines of selected intervals are formed. The cut sections are then superimposed one upon the other in the order of the contour lines until the relief map is formed.

4 Claims, 2 Drawing Figures

METHOD OF FORMING THREE DIMENSIONAL RELIEF MAPS

This is a Continuation application of Ser. No. 839,934, filed Oct. 6, 1977 and now abandoned.

The object of the present invention is to permit the rapid, economical and precise making of a representative relief model on a plane without using machines or special materials.

It is known, in fact, that some processes have made use of a cutting of a single thickness of a plate material, on the surface of which the relief of the terrain is indicated by contour lines. This often oblique cutting permits off-setting in height the various cuttings which one can then immobilize by gluing. The cutting in an oblique direction permits taking up the "play" given by the thickness of the blade which has made the cut. This system is unfortunately difficult to employ without precision tooling.

The invention consists in cutting out, usually by hand, with an office blade called "cutter", the tracings of the contour lines of a map or plan glued on a light material sufficiently resistant to pressure. This material may be expanded plexiglass formed of methacrylic products such as methyl polymethacrylate.

Generally three identical copies of the maps (1), (2) and (3) are glued on three sheets of base material, and each of the plates it cut out, one on the third line or curve, the second following the second line, the third following the first line and so forth. Then these various cuttings are glued with the offset indicated by the tracing of the lines.

This gluing on plates over relatively big surfaces in relation to the small thickness of the plates assures a considerable strength of the assembly despite the lightness of the materials. It is always possible to fill out the overhanging portions on the basis of a light framework or even a foam supporting the assembly without deformation.

The attached drawing illustrates, by way of example, a mode of carrying the process according to the invention into effect. FIG. 1 shows the three plates seen in section (1), (2) and (3) with the contour lines in units of 10, such as 0, 10, 20 . . . 1000, corresponding to the offset cuttings (I), (II), (III) . . . (IX) and (X) of FIG. 2, also in section. Note the elements (A) and (B) which are used as base border.

It is easily seen that the making of a model is effected very quickly in comparison with the classic processes, which is a considerable economic advantage in that it permits the immediate materialization of a plan before it is carried out. The invention applies particularly to architects' offices for the planning of large-scale works in the public as well as the private sector.

We claim:

1. A method of forming a three dimensional relief map comprising the steps of employing a predetermined number of identical planar maps having intervals of contour lines drawn thereon, cutting each map in sequence to provide from each of said maps a section defined along one edge by a first contour line and along a second edge by a second contour line spaced at a selected interval therefrom, with at least one contour line intermediate and less than the total extent of said map, the one edge of each section cut from each succeeding map in said sequence being defined by the next adjacent succeeding contour line in order from that of the one edge of the section cut from the preceding map until at least one section from each map is cut, and thereafter cyclically repeating the cutting of said maps in successive order until a selected number of successive sections are obtained, and thereafter superimposing said sections one on the other in order of the next adjacent succeeding contour line one upon the other until said relief map is completed.

2. The method according to claim 1, including the step of securely mounting each map on a substantially rigid planar base before cutting.

3. The method according to claim 2, wherein said base is selected from the group consisting of expanded plexiglass and acrylic.

4. The method according to claim 1, wherein the interval between the pair of spaced contour lines defining each section is equal to the number of the maps employed.

* * * * *